(12) United States Patent
Wang et al.

(10) Patent No.: US 6,947,948 B2
(45) Date of Patent: Sep. 20, 2005

(54) VERSION-ENABLED, MULTI-TYPED, MULTI-TARGETING REFERENTIAL INTEGRITY RELATIONAL DATABASE SYSTEM AND METHODOLOGY

(75) Inventors: Andy I-Shin Wang, Palo Alto, CA (US); David M. Choy, Los Altos, CA (US); Lily L. Liang, San Jose, CA (US); James J. Lin, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 10/128,428

(22) Filed: Apr. 23, 2002

(65) Prior Publication Data

US 2003/0200219 A1 Oct. 23, 2003

(51) Int. Cl.[7] .............................................. G06F 17/30
(52) U.S. Cl. ...................................................... 707/102
(58) Field of Search .................... 707/1–10, 100–104.1; 709/203; 715/853; 717/105, 108, 126, 866; 706/45

(56) References Cited

U.S. PATENT DOCUMENTS

| | | | |
|---|---|---|---|
| 4,751,740 A | | 6/1988 | Wright |
| 4,969,091 A | | 11/1990 | Muller |
| 5,615,337 A | | 3/1997 | Zimowski et al. |
| 5,644,768 A | | 7/1997 | Periwal et al. |
| 5,680,557 A | * | 10/1997 | Karamchetty ............... 715/866 |
| 5,701,400 A | * | 12/1997 | Amado ......................... 706/45 |
| 5,742,810 A | | 4/1998 | Ng et al. |
| 5,742,813 A | * | 4/1998 | Kavanagh et al. ............. 707/8 |
| 5,774,719 A | | 6/1998 | Bowen |
| 5,778,398 A | | 7/1998 | Nagashima et al. |
| 5,799,310 A | | 8/1998 | Anderson et al. |
| 5,819,252 A | | 10/1998 | Benson et al. |
| 5,862,378 A | | 1/1999 | Wang et al. |
| 5,875,332 A | | 2/1999 | Wang et al. |
| 5,892,902 A | | 4/1999 | Clark |

(Continued)

FOREIGN PATENT DOCUMENTS

WO    WO 99/22362    5/1999

OTHER PUBLICATIONS

Jeonghee Kim, Taissok Han, and Suk Kyoon Lee, "Visualization of Path Expressions in a Visual Object–Oriented Database Query Language," (2 pages).

Chien–I Lee, Ye–In Chang, and Wei–Pang Yang, "Design Of A New Indexing Organization For A Class–Aggregation Hierarchy In Object–Oriented Databases", Journal of Information Science and Engineering 15, 1999, pp. 217–241, Taiwan.

Jörn W. Janneck and Martin Naedele, "Modeling Hierarchical and Recursive Structures Using Parametric Petri Nets." Computer Engineering and Networks Laboratory, Swiss Federal Institute of Technology Zurich, pp. 445–452.

(Continued)

*Primary Examiner*—Diane D. Mizrahi
(74) *Attorney, Agent, or Firm*—David W. Victor; Konrad Raynes & Victor LLP

(57) ABSTRACT

A relational database is disclosed which includes a number of target tables each exhibiting a different type, such as a general contact table, a personal contact table and a department contact table. The relational database includes a super-column which is divided into a number of columns corresponding to the number of types of target tables. A respective column is allocated in the super-column for each of the types of the target tables. Valuable system memory space is consequently conserved. Multiple-typed tables and multi-targeted tables are supported, and multi-version data storage capabilities are provided.

23 Claims, 8 Drawing Sheets

U.S. PATENT DOCUMENTS

| | | | |
|---|---|---|---|
| 5,940,616 A | | 8/1999 | Wang |
| 5,953,525 A | * | 9/1999 | Glaser et al. ............... 717/105 |
| 5,956,036 A | * | 9/1999 | Glaser et al. ............... 715/853 |
| 6,012,067 A | | 1/2000 | Sarkar |
| 6,016,394 A | | 1/2000 | Walker |
| 6,016,497 A | * | 1/2000 | Suver ..................... 707/103 R |
| 6,047,291 A | | 4/2000 | Anderson et al. |
| 6,052,693 A | * | 4/2000 | Smith et al. ............. 707/104.1 |
| 6,055,637 A | | 4/2000 | Hudson et al. |
| 6,063,133 A | | 5/2000 | Li et al. |
| 6,065,117 A | | 5/2000 | White |
| 6,067,414 A | | 5/2000 | Wang et al. |
| 6,088,524 A | | 7/2000 | Levy et al. |
| 6,104,393 A | | 8/2000 | Santos-Gomez |
| 6,128,621 A | | 10/2000 | Weisz |
| 6,148,342 A | | 11/2000 | Ho |
| 6,161,182 A | | 12/2000 | Nadooshan |
| 6,167,405 A | | 12/2000 | Rosensteel, Jr. et al. |
| 6,173,400 B1 | | 1/2001 | Perlman et al. |
| 6,219,826 B1 | | 4/2001 | De Pauw et al. |
| 6,233,586 B1 | | 5/2001 | Chang et al. |
| 6,263,313 B1 | | 7/2001 | Milsted et al. |
| 6,263,342 B1 | | 7/2001 | Chang et al. |
| 6,272,488 B1 | | 8/2001 | Chang et al. |
| 6,279,008 B1 | * | 8/2001 | Tung Ng et al. ........... 707/102 |
| 6,279,111 B1 | | 8/2001 | Jensenworth et al. |
| 6,282,649 B1 | | 8/2001 | Lambert et al. |
| 6,289,344 B1 | | 9/2001 | Braia et al. |
| 6,289,458 B1 | | 9/2001 | Garg et al. |
| 6,292,936 B1 | | 9/2001 | Wang |
| 6,308,274 B1 | | 10/2001 | Swift |
| 6,314,449 B1 | | 11/2001 | Gallagher et al. |
| 6,327,629 B1 | | 12/2001 | Wang et al. |
| 6,338,056 B1 | | 1/2002 | Dessloch et al. |
| 6,339,777 B1 | | 1/2002 | Attaluri et al. |
| 6,343,286 B1 | | 1/2002 | Lee et al. |
| 6,550,057 B1 | * | 4/2003 | Bowman-Amuah ......... 717/126 |
| 6,601,234 B1 | * | 7/2003 | Bowman-Amuah ......... 717/108 |
| 6,636,845 B2 | * | 10/2003 | Chau et al. .................... 707/1 |
| 2001/0002486 A1 | | 5/2001 | Kocher et al. |
| 2001/0008015 A1 | | 7/2001 | Vu et al. |
| 2001/0019614 A1 | | 9/2001 | Madoukh |

OTHER PUBLICATIONS

Akira Kawaguchi, Daniel Lieuwen, Inderpal Mumick, Kenneth Ross, "Implementing Incremental View Maintenance in Nested Data Models" Database Programming Languages, 6$^{th}$ International Workshop, DBPL–6, Aug. 18–20, 1997 Proceedings, pp. 203–221.

Li Tian–Zhu, "Normalization of Nested Structure for Complex Objects" in Chinese, Journal of Software, vol. 9, No. 5, p. 390–396, May 1998, (with English Abstract).

* cited by examiner

FIG. 1A
(PRIOR ART)

CONTACT TABLE
(PARENT TABLE)

PRIMARY KEY

| CONTACT ID | FIRST NAME | LAST NAME | EMAIL ADDRESS |
|---|---|---|---|
| 1 | HARRY | LOWE | HLOWE@ZZZ.NET |
| 2 | ANN | ELECTA | ELECTA@TEST.COM |
| 3 | RICHARD | ROBERTS | RROB@SAMPLE.NET |
| ... | ... | ... | ... |

FIG. 1B
(PRIOR ART)

NEWSLETTER TABLE
(PARENT TABLE)

PRIMARY KEY

| NEWSLETTER ID | NAME | DESCRIPTION |
|---|---|---|
| 1 | DAVIS ELEMENTARY SCHOOL PARENTS' FLYER | ********** |
| 2 | VALLEY DISTRICT NEWS | ********** |
| 3 | EDISON PTA NEWS | ********** |
| ... | ... | ********** |

FIG. 1C
(PRIOR ART)

CONTACT - NEWSLETTER
LINKING TABLE
(CHILD TABLE)

| FOREIGN KEY | FOREIGN KEY |
|---|---|
| CONTACT ID | NEWSLETTER ID |
| 1 | 2 |
| 2 | 1 |
| 2 | 2 |
| 3 | 1 |
| ... | ... |

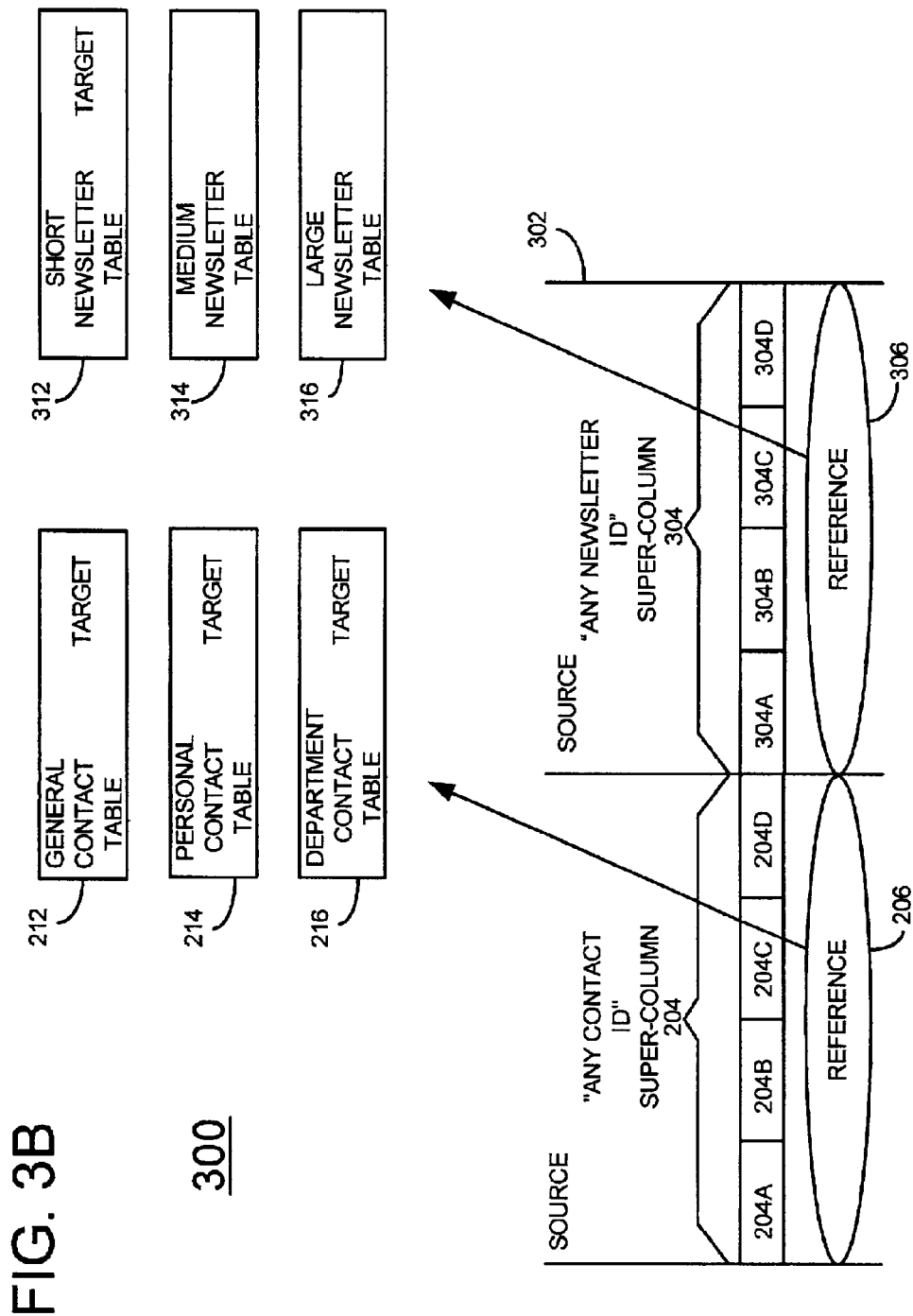

US 6,947,948 B2

VERSION-ENABLED, MULTI-TYPED, MULTI-TARGETING REFERENTIAL INTEGRITY RELATIONAL DATABASE SYSTEM AND METHODOLOGY

FIELD OF THE INVENTION

The disclosures herein relate generally to content management systems and more particularly to relational databases.

BACKGROUND

A relational database typically includes several tables with rows and column populated with data such as the CONTACT TABLE of FIG. 1A and the NEWSLETTER TABLE of FIG. 1B. The primary key field of a table typically refers to a column in the table which is unique to that table and which functions as an index for that table. The actual primary key value for each record of the table must contain data unique to that particular record. In FIG. 1A the CONTACT ID field is the primary key and in FIG. 1B the NEWSLETTER ID field is the primary key. Two tables can be linked together by another table called a linking table such as the CONTACT-NEWSLETTER LINKING TABLE of FIG. 1C. Since a linking table relates one table to another table, the term "relational database" is used to describe the resultant database.

A "foreign key" relationship exists between the CONTACT-NEWSLETTER LINKING TABLE of FIG. 1C and the CONTACT TABLE of FIG. 1A because the LINKING TABLE of FIG. 1C includes the primary key "CONTACT ID" from the CONTACT TABLE of FIG. 1A. Likewise, a "foreign key" relationship exists between the CONTACT-NEWSLETTER LINKING TABLE of FIG. 1C and the NEWSLETTER TABLE of FIG. 1B because the LINKING TABLE of FIG. 1C includes the primary key "NEWSLETTER ID" from the NEWSLETTER TABLE of FIG. 1B.

The CONTACT TABLE of FIG. 1A and the NEWSLETTER TABLE of FIG. 1B. are referred to as "parent tables" because they are the source of the primary keys which populate the LINKING TABLE of FIG. 1C. The LINKING TABLE of FIG. 1C is referred to as the "child table" since it contains the foreign keys which point back to the parent tables. The child table is dependent because its foreign key values are constrained to be values of the primary keys in the parent tables.

In relational databases, foreign keys are widely used in linking tables to establish a special referential relationship between two tables. However, foreign keys have several limitations in a real-world referential relationship between two tables. These limitations include no data definition support for allowing multiple parent tables and no data modification support for allowing multiple parent tables. Moreover, foreign keys do not provide version support.

What is needed is a mechanism and methodology for removing these limitations when using a foreign key to establish a relationship between tables.

SUMMARY

Accordingly, in one embodiment a database is disclosed including a plurality of first target tables exhibiting different table types. The database system further includes a source table including a plurality of records, each record having a common super-column including a plurality of sub-columns. At least one of the sub-columns of a particular is record references one of the table types of the plurality of first target tables.

Principal advantages of the embodiment disclosed herein include support for multi-typed target tables, multiple targeting and multiple versioning as explained subsequently.

BRIEF DESCRIPTION OF THE DRAWINGS

FIG. 1A is a CONTACT TABLE employed in a typical relational database.

FIG. 1B is a NEWSLETTER TABLE employed in a typical relational database.

FIG. 1C is a CONTACT-NEWSLETTER LINKING TABLE employed in a relational database.

FIG. 3B is a relational database capable of handling both multiple contact types and multiple newsletter types by using both an "any contact ID" super-column and an "any newspaper ID" super-column.

DETAILED DESCRIPTION

When a conventional relational database system (RDBS) is created, foreign keys are statically defined. In other words, a particular foreign key in a child table can not point to one parent table under certain conditions and then point to another parent table under other conditions. A particular foreign key can only point to one parent table for the life of that table. In this respect, the conventional foreign key is regarded as being "single-typed". There is no data definition support for allowing a conventional foreign key to point to multiple parent tables during data definition time. Data definition time is defined to be the time when tables in an RDBS are initially set up, namely the time before such tables are populated with data.

Moreover, during "run time" such a database has no data modification support for foreign keys. Run time is defined to be the time when the already initialized tables are populated with data, record by record. Another problem encountered with the conventional RDBS is that there is no versioning capability. For example, in the contact table of FIG. 1A, it is not possible to have two different versions of CONTACT ID 1 or two different versions of CONTACT ID 2.

Figure 2:
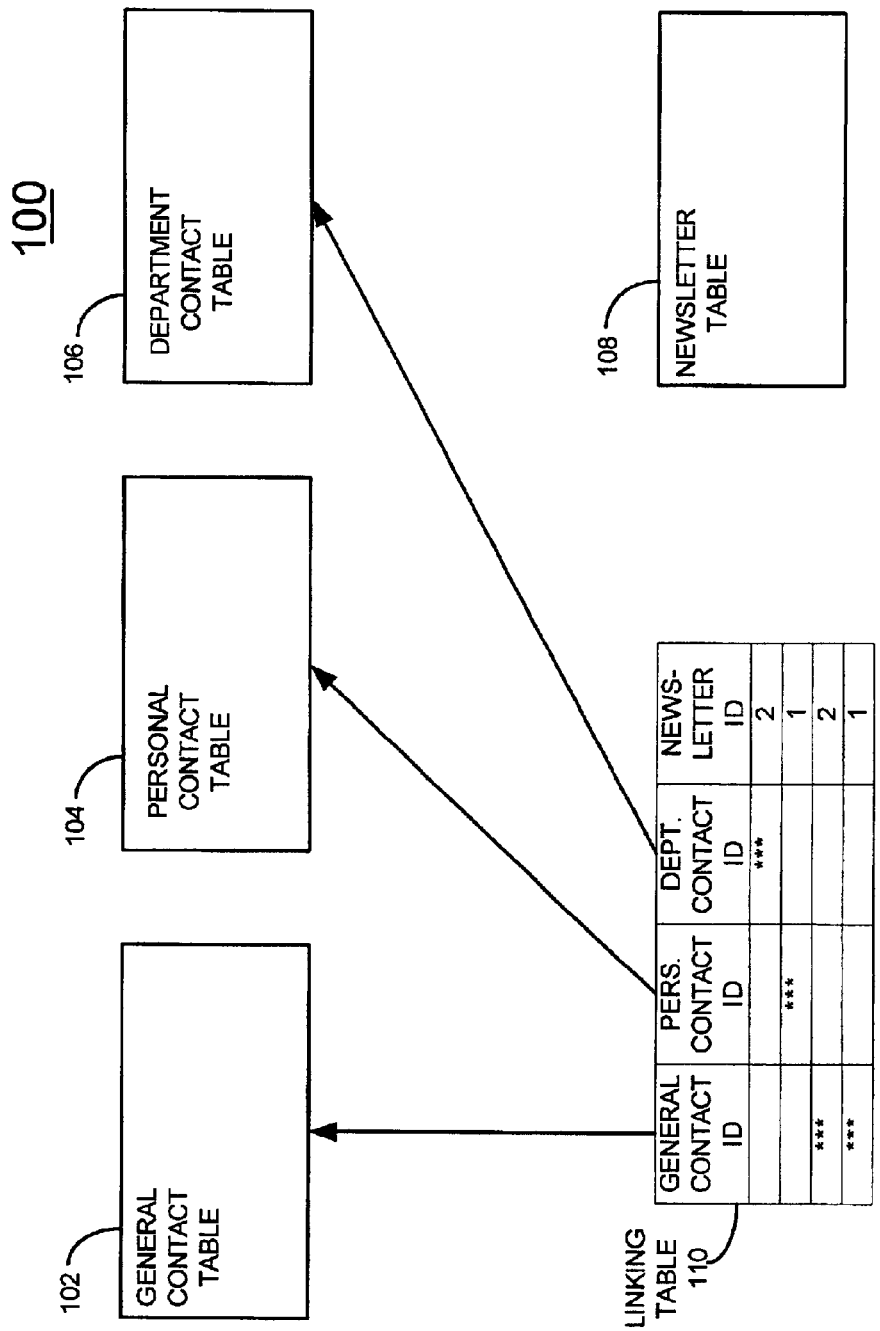
FIG. 2 is a relational database which is capable of handling multiple contact types.

As seen in FIG. 1A, once the tables of this conventional RDBS are created during data definition time and then populated with data at run time, the RDBS is static in the sense that it is difficult to modify the database to add support for multiple contact types or multiple versions. There is simply one contact type, namely "CONTACT ID" and one version of each CONTACT ID record. One possible solution for adding support of multiple data types is shown in FIG. 2 as RDBS 100. Comparing FIG. 2 to FIGS. 1A–1C, the contact table of FIG. 1A has been divided into three separate table types designated GENERAL CONTACT table 102, PERSONAL CONTACT table 104 and DEPARTMENT CONTACT table 106. Contact tables 102, 104 and 106 employ the same fields as the contact table of FIG. 1A. RDBS 100 also includes a NEWSLETTER table 108 employing the same fields as the newsletter table of FIG. 1B. Since the contact table is now divided into three contact type tables 102, 104 and 106, the LINKING table 110 is likewise divided into multiple columns as shown in FIG. 2. Each of the contact ID columns of FIG. 2, namely GENERAL CONTACT ID, PERSONAL CONTACT ID and DEPARTMENT CONTACT ID correspond to a different contact type table 102, 104 and 106, respectively. Unfortunately, when LINKING table 110 is so divided and populated with foreign key contact type information (indicated by asterisks) many of the fields are left unpopulated. Such an approach, while functional, wastes a large amount of valuable storage space and is thus inefficient.

Figure 3A:
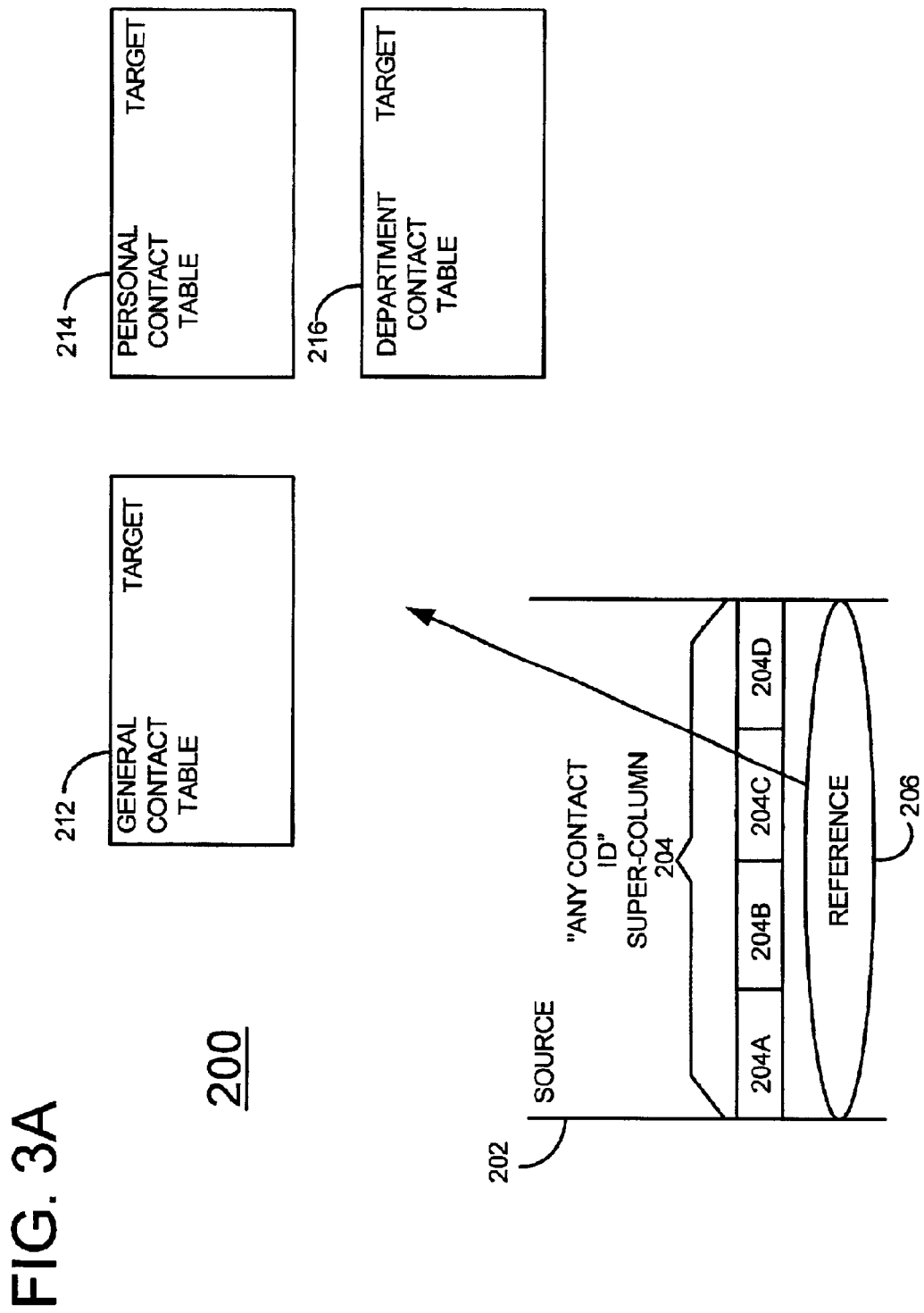
FIG. 3A is a relational database capable of handling multiple contacts types by using an "any contact ID" super-column.

To solve the problems discussed above, FIG. 3A shows an RDBS 200 which is capable of multiple types, multiple targeting and multiple versioning as will subsequently be explained. RDBS 200 includes a source table 202, a portion of which is shown as having a "super-column" 204 which is divided into a plurality of sub-columns, for example 4 sub-columns in this particular embodiment. As seen in FIG. 3A, super-column 204 includes "target table name" sub-column 204A, "target row ID" sub-column 204B, "referential integrity (RI) row ID" sub-column 204C and "target version number" sub-column 204D. By including this information in super-column 204, source table 202 is provided with great flexibility in being able to target multiple types of target records among target tables 212, 214 and 216. While in the present example, we have zoomed in on super-column 204 for discussion purposes, it should be understood that source table 202 will in actual practice include other columns which are defined by the user as desired.

A relational database view function can be used to make it appear to the user that super-column 204 is one column, when in actual practice it is implemented as multiple sub-columns in this particular example. From the user's perspective, super-column 204 will appear as a reference, namely reference 206 as indicated in FIG. 3A. Reference 206 represents any contact and is capable of pointing to any of the contact tables such as GENERAL CONTACT table 212, PERSONAL CONTACT table 214 and DEPARTMENT CONTACT table 216. Stated alternatively, the "any contact" reference 206 associated with source table 202 is capable of pointing to any of target contact tables 212, 214 and 216.

Super-column 204 provides both a multi-type feature and a multi-targeting feature. It is noted that the multi-type feature is similar to the multi-targeting feature. What is important is that reference 206, although single-valued, can point to different types (tables) and different targets (records). At run time RDBS 200 exhibits a multi-type feature because source table 202 and its super-column 204 can point to multiple types of tables, for example one of contact tables 212, 214 and 216. More particularly, "target table name" sub-column 204A of the super-column can point to these different table types as desired by the user. RDBS 200 also exhibits a multi-targeting capability at run time because its super-column 204 can point to multiple targets within tables 212, 214 and 216. For example, in more detail, "target row ID" sub-column 204B can point to such multiple different targets.

This solves two very significant problems associated with foreign keys, namely that they can not point to multiple type tables once the tables are set up and that they can not point to multiple targets once the tables are populated with data. While tables 212, 214 and 216 correspond to different types or species, namely a general contact table, a personal contact table and a department contact table, respectively, they are related in that they are of the same genus, namely they are all contact tables. The usage of "referential integrity (RI) row ID" sub-column, 204C and "target version number" sub-column 204D are discussed later.

FIG. 3B illustrates an alternative embodiment of the disclosed RDBS as RDBS 300. RDBS 300 is similar to RDBS 200 of FIG. 3A with like numbers indicating like elements. RDBS 300 is different from RDBS 200 in that it's source table 302 includes two super columns, namely super-column 204 (already discussed above) and a second super-column 304. RDBS 300 is also different from RDBS 200 in that it includes 3 types of target newsletter tables, namely SHORT NEWSLETTER table 312, MEDIUM NEWSLETTER table 314 and LARGE NEWSLETTER table 316. To accommodate the multiple types or multi-typing of newsletter tables 312, 314 and 316, RDBS 300 includes an "ANY NEWSPAPER ID" super-column 304 which is divided into a plurality of sub-columns, for example 4 sub-columns in this particular embodiment. As seen in FIG. 3B, super-column 304 includes "target table name" sub-column 304A, "target row ID" sub-column 304B, "referential integrity (RI) row ID" sub-column 304C, and "target version number" sub-column 304D. By including this information in super-column 304, source table 302 is provided with great flexibility in being able to target multiple types of target records among target tables 212, 214 and 216, as well as target tables 312, 314 and 316. While in the present example, we have zoomed in on super-column 304 (and super-column 204) for discussion purposes, it should be understood that source table 302 will in actual practice include other columns which are defined by the user as desired.

A relational database view function can again be used to make it appear to the user that super-column 304 is one column, when in actual practice it is implemented as multiple sub-columns in this particular example. From the user's perspective, super-column 304 will appear as a reference, namely reference 306 as indicated in FIG. 3B. Reference 306 represents any newsletter type and is capable of pointing to any of the newsletter tables such as SHORT NEWSLETTER table 312, MEDIUM NEWSLETTER table 314 and LARGE NEWSLETTER table 316. In other words, the "ANY NEWSLETTER ID" reference 306 associated with source table 302 is capable of pointing to any of target newsletter tables 312, 314 and 316. Multi-typing and multi-targeting is thus provided by source table 302 via its "any newsletter" super-column 304. If desired, super-column 304 could also be programmed to point to any of the contact tables such as GENERAL CONTACT table 212, PERSONAL CONTACT table 214 and DEPARTMENT CONTACT table 216. Great flexibility is provided by this RDBS architecture.

Figure 4:
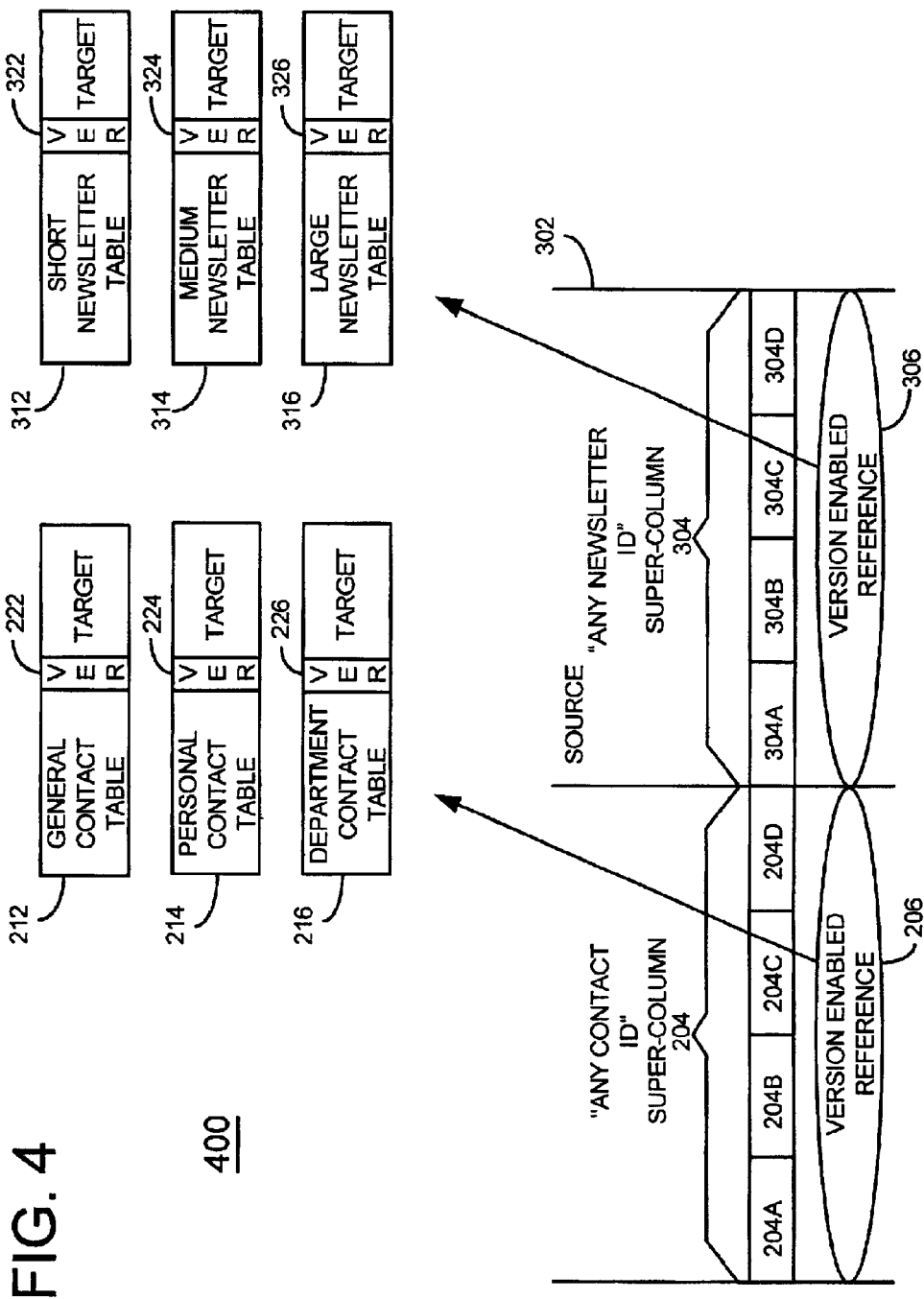
FIG. 4 is a relational database including versioning capability.

FIG. 4 illustrates an RDBS 400 similar to RDBS 300 of FIG. 3B and including a versioning capability. For example, rather than simply overwriting an old version of a contact with a new version of a contact, RDBS 400 saves and keeps track of older versions. Super-column 204 is version-enabled meaning that the super-column not only tracks the contact type and target in one example, but also tracks the particular version of the designated target contact type. More specifically, "target version number" sub-column 204D points to a particular contact type version in one of target tables 212, 214 or 216. The actual version information is stored in the designated VERSION field 222, 224 or 226, respectively, of these target tables. In one embodiment, contact target tables 212, 214 and 216 store the most recent version, the oldest (original) version or any specific version of the contact information. The VERSION field 222, 224 and 226 stores the version information while the remaining fields of target contact tables 212, 214 and 216 store the actual contact data.

From the user's perspective, super column 204 will appear as a reference, namely version-enabled reference 206 at source table 302 as indicated in FIG. 4. Reference 206 represents any contact and is capable of pointing to any of the contact type tables (target tables) such as GENERAL CONTACT table 212, PERSONAL CONTACT table 214 and DEPT. CONTACT table 216. Version-enabled reference 206 also points to the particular version of the contact information desired whether it be the most recent version, the original version or a particular specific version. Multi-typing, multi-targeting and versioning capability are thus provided by source table 302 via its "any contact" super-column 204 operating in the database in conjunction with target contact tables 212, 214 and 216.

In more detail, it is noted that a reference such as version-enabled reference 206 uniquely identifies a referential relationship between a source row in source table 302 and a target row component in the target tables 212, 214 and 216. A source row may include zero or more references. A reference may be single-valued (i.e. referencing one target row) and is free to point to any row of any target table. A reference includes on-insert, on update, and on delete referential integrity on source rows which is maintained by the database system. Moreover, a reference has on-delete referential integrity (restrict, no action, set null, or cascade) on target rows which is also maintained by the database system. A reference also exhibits versioning referential integrity (referring to a specific or most current version) on both source and target rows which is again maintained by the database system. This referential integrity is specified during run time.

Figure 5:
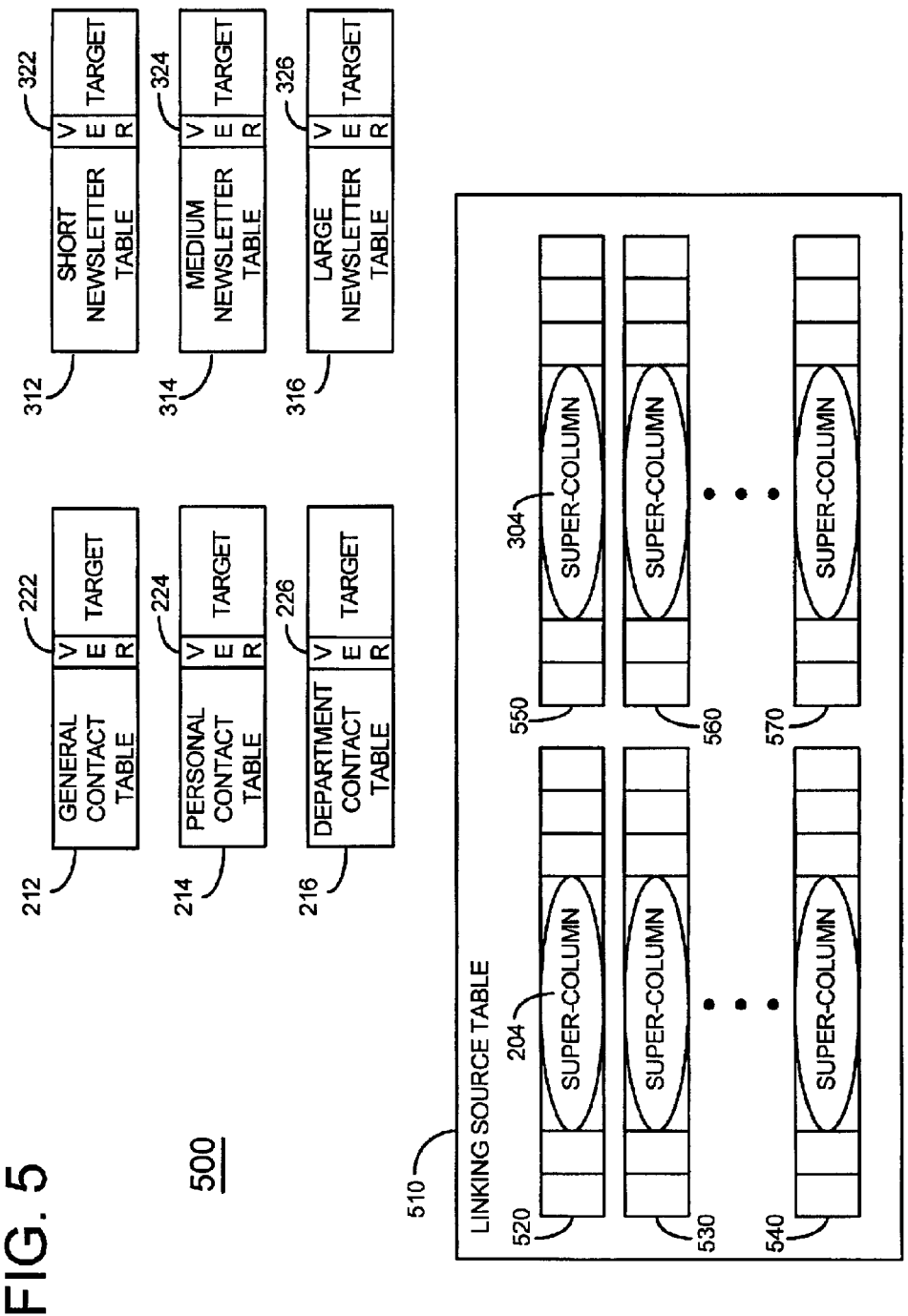
FIG. 5 a relational database including a linking source table capable of pointing to multiple types, multiple targets and multiple versions in the target tables.

As mentioned earlier, super-column 304 is similar to super-column 204 and can be populated to point to multiple types and targets in target tables 212, 214, 216, 312, 314 and 316. Each of these tables includes a version field. Target tables 312, 314 and 316 include version fields 322, 324 and 326. In actual practice source tables may include other columns and rows in addition to super-columns 204 and 304 as desired by the user or others. For example, FIG. 5 shows an RDBS 500 that includes a source table 510 which is a linking table. Source table 510 is also called a linking source table. Linking source table 510 includes multiple rows and columns. The records 520, 530, 540, 550, 560 and 570 include super columns such as 204 and 304. Moreover, these records include other columns in addition to columns 204 and 304 as desired by the user or others. The super-columns in the records of source table 510 exhibit the multi-typed, multi-targeting, multi-versioning features described above. Adjacent records 520 and 550 can together be considered a record of source tables 510. Likewise adjacent records 530 and 560 can together be considered a record of source table 510.

Figure 6:
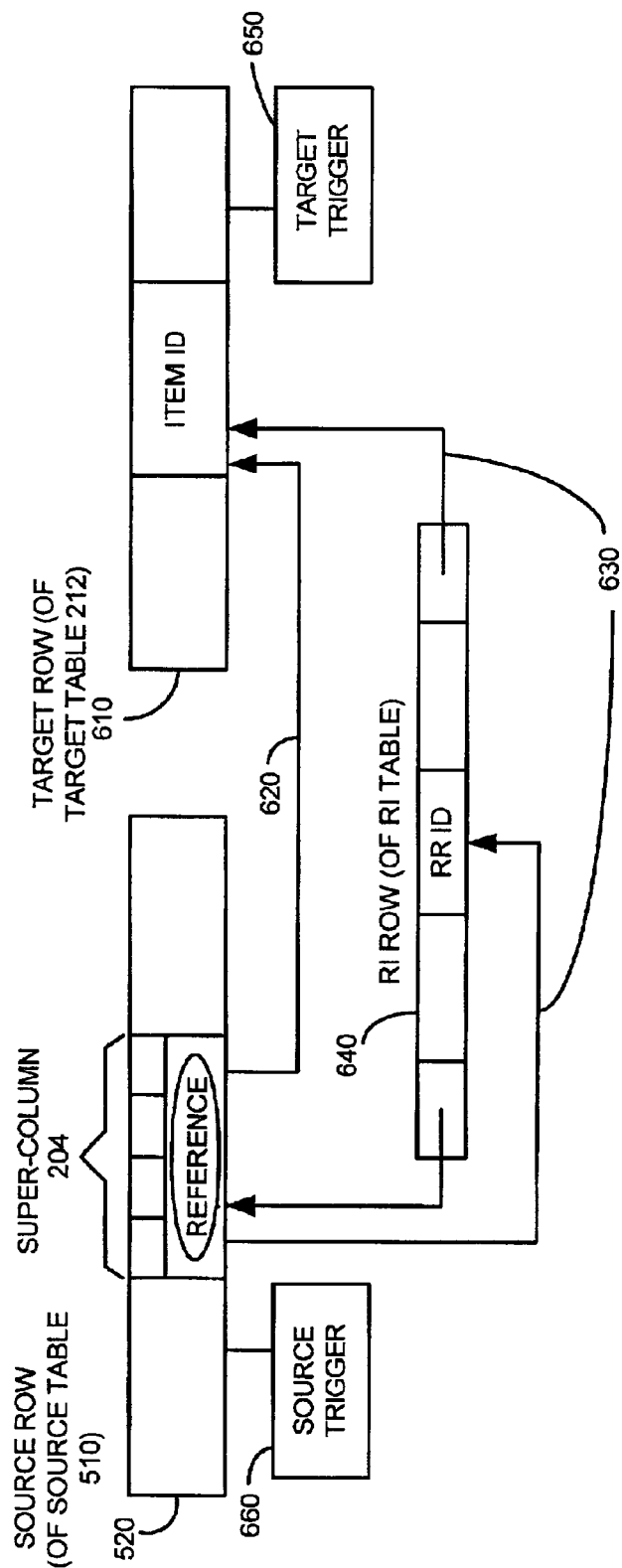
FIG. 6 depicts a representative row of a source table and a representative row of a target table having a direct path therebetween and a path through a referential integrity (RI) table.

FIG. 6 shows the relation between a representative source row 520 of source table 510 and a representative target row 610 of target table 212 in more detail. While there is a direct path 620 between source row 520 and target row 610, there is also a referential integrity path 630 through Referential Integrity Table of which a representative RI row 640 is shown. While the actual RDBS employs a source table, an RI table and target table, or a plurality thereof, for simplicity a source row 520, an RI row 640 of an RI table and a target row 610 of target table 212 have been shown in FIG. 6 instead of the entire table structures. The RI table is used to maintain referential integrity of all the references that exist in the data base system. Each row (such as row 640) in the RI table represents a reference which is composed of source and target row information.

In path 630, instead of pointing directly from source row 520 to target row 610, source row 520 points to RI row 640 of the RI table for the purpose of maintaining referential integrity. However, direct path 620 provides high execution speed while RI path 630 maintains referential integrity. The path through RI row 640 and its RI table is transparent to the user.

To maintain referential integrity, target row 610 is synchronized with RI row 640 of the RI table. Whenever there is a delete in the target table, there is a corresponding delete in the RI table. Once this synchronization between the target table and RI table is carried out for a particular row, further synchronization between the RI table and the source table is conducted. From the source table to the RI table, a foreign key-like relationship is defined from the RI ROW ID (one column of the super-column) to the RI column (a primary key) in the RI table. However, from the RI table to the target table, there is no foreign key relationship. (It will be recalled that RI ROW ID is one sub-column of super column 204, namely "referential integrity (RI) row ID" sub-column 204C, as shown in FIG. 3A.

Even though there is no foreign key relationship between the target table and the RI table (e.g. between target row 610 and RI row 640 in FIG. 6), there is a target trigger 650 monitoring changes made to the target table. When target trigger 650 detects that a delete or other change has been made to the target table, it instructs the RI table to make the same delete or other change in the corresponding record in the RI table. Changes made to the RI table are cascaded back to the source table of which source row 520 is a member. It is noted that target trigger 650 includes trigger logic which is dynamically attached to the target table as needed to synchronize deletions and changes between the target and RI tables. These deletions and changes include version deletions and version changes.

A source trigger 660 is attached to source table 510 which includes source row 510 as shown in FIG. 6. Source trigger 660 takes care of forward deleting the corresponding RI row when a source row is deleted. To summarize trigger operation, as described above, on delete and update triggers are attached to source and target tables for maintaining global referential integrity. Source table triggers are statically created during source table generation whereas target triggers are dynamically created.

Figure 7:
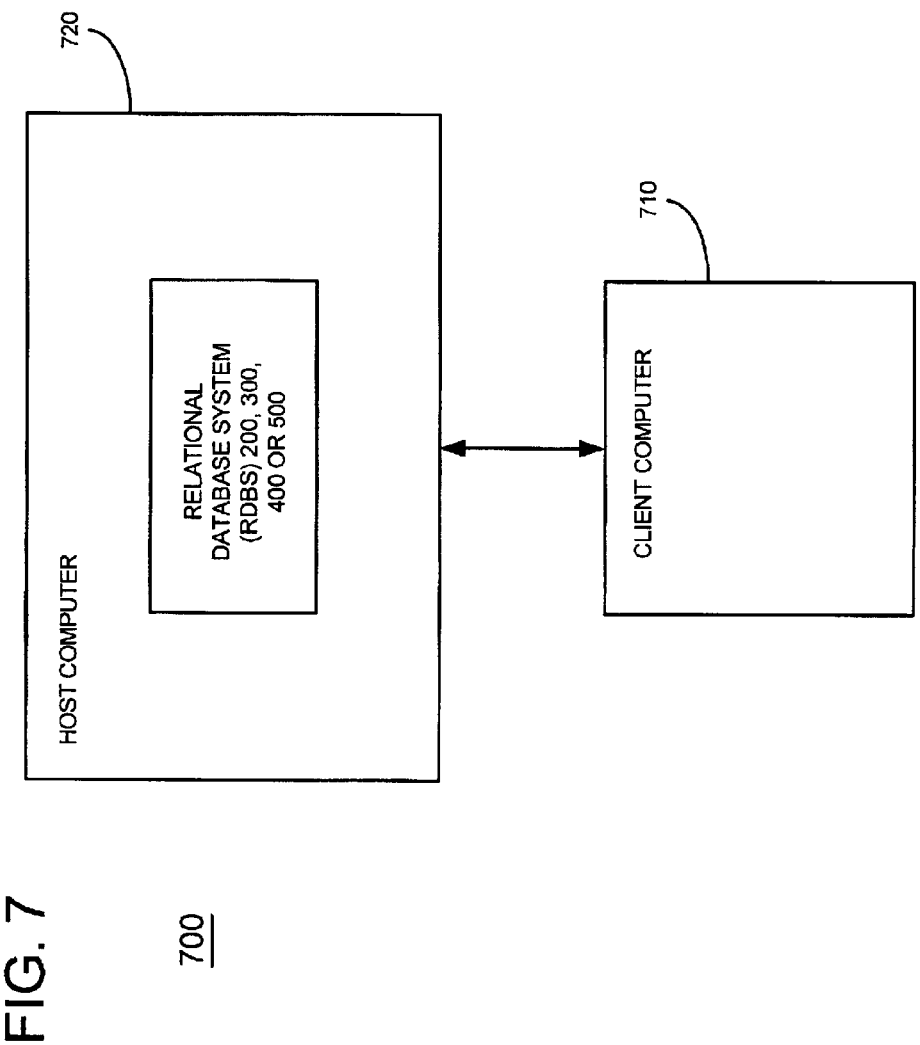
FIG. 7 is a block diagram of a host-client computer system employing the disclosed relational database system.

FIG. 7 is a block diagram of an information handling system or computer system 700 on which relational database systems (RDBS's) 200, 300, 400 or 500 are operated. More particularly, computer system 700 includes a client computer 710 which is coupled 20 to a server computer or host 720. RDBS's 200, 300, 400 or 500 are installed on server or host computer 720 as shown. Client computer 710 sends queries to the RDBS in server computer 710 and receives results back from that RDBS.

The disclosed content management system can be stored on virtually any computer-readable storage media, such as CD, DVD and other magnetic and optical media in either compressed or non-compressed form. Of course, it can also be stored on a server computer system or other information handling system.

The principal advantages of these embodiments are the providing of a relational database system and methodology which permits multi-typing, multi-targeting and multi-versioning while conserving valuable memory space in the host server system.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A computer implemented database system, wherein the database is configured to include:
   a plurality of target tables exhibiting different table types; and
   a source table including a plurality of records, each record having a common super-column including a plurality of sub-columns, at least one of the sub-columns of a particular record referencing one record in one of the table types of the plurality of target tables, wherein the source table is capable of being configured to have multiple records referencing records in multiple of the target tables.

2. The computer implemented database system of claim 1 wherein one of the sub-columns of the super-column is a target table name sub-column.

3. The computer implemented database system of claim 1 wherein one of the sub-columns of the super-column is a target row ID sub-column.

4. The computer implemented database system of claim 1 wherein one of the sub-columns of the super-column is a referential integrity row ID.

5. The computer implemented database system of claim 1 wherein one of the sub-columns of the super-column is a target version number.

6. A computer implemented database system configured to comprise:
   a plurality of first target tables exhibiting different table types;
   a plurality of second target tables exhibiting different table types; and
   a linking source table including a plurality of records, each record having first and second super-columns, each super column including a plurality of sub-columns, at least one of the sub-columns of a record's first super-column referencing one of the table types of the plurality of first target tables, at least one of the sub-columns of a record's second super-column referencing one of the table types of the plurality of second target tables.

7. The computer implemented database system of claim 6 wherein the first and second super-columns include respective first and second target table name sub-columns.

8. The computer implemented database system of claim 6 wherein the first and second super-columns include respective first and second target row ID sub-columns.

9. The computer implemented database system of claim 6 wherein the first and second super-columns include respective first and second referential integrity row ID sub-columns.

10. The computer implemented database system of claim 6 wherein the first and second super-columns include respective first and second target version number sub-columns.

11. A method of configuring a computer implemented database system comprising:
    providing a plurality of target tables exhibiting different table types; and
    providing a source table including a plurality of records, each record having a common super-column including a plurality of sub-columns, at least one of the sub-columns of a particular record referencing one record in one of the table types of the plurality of target tables, wherein the source table is capable of being configured to have multiple records referencing records in multiple of the target tables.

12. The method of claim 11 wherein one of the sub-columns of the super-column is a target table name sub-column.

13. The method of claim 11 wherein one of the sub-columns of the super-column is a target row ID sub-column.

14. The method of claim 11 wherein one of the sub-columns of the super-column is a referential integrity row ID.

15. The method of claim 11 wherein one of the sub-columns of the super-column is a target version number.

16. A method of configuring a computer implemented database system comprising:
    providing a plurality of first target tables exhibiting different table types;
    providing a plurality of second target tables exhibiting different table types; and
    providing a linking source table including a plurality of records, each record having first and second super-columns, each super column including a plurality of sub-columns, at least one of the sub-columns of a record's first super-column referencing one of the table types of the plurality of first target tables, at least one of the sub-columns of a record's second super-column referencing one of the table types of the plurality of second target tables.

17. The method of claim 16 wherein the first and second super-columns include respective first and second target table name sub-columns.

18. The method of claim 16 wherein the first and second super-columns include respective first and second target row ID sub-columns.

19. The method of claim 16 wherein the first and second super-columns include respective first and second referential integrity row ID sub-columns.

20. The method of claim 16 wherein the first and second super-columns include respective first and second target version number sub-columns.

21. A computer program product for organizing information in a content management system, the computer program product including a plurality of computer executable instructions stored on a computer readable medium, wherein the instructions, when executed by the content management system, cause the system to perform:
    providing a plurality of target tables exhibiting different table types; and
    providing a source table including a plurality of records, each record having a common super-column including a plurality of sub-columns, at least one of the sub-columns of a particular record referencing one record in one of the table types of the plurality of target tables, wherein the source table is capable of being configured to have multiple records referencing records in multiple of the target tables.

22. The computer program product of claim 21 wherein the computer readable medium is an optical disk.

23. The computer program product of claim 21 wherein the computer readable medium is a magnetic disk.

* * * * *